United States Patent [19]
Hicks

[11] Patent Number: 6,079,858
[45] Date of Patent: Jun. 27, 2000

[54] SIDE VIEW MIRROR WITH DETACHABLE FLASHLIGHT

[75] Inventor: Thomas S. Hicks, Livonia, Mich.

[73] Assignee: Lear Automotive Dearborn, Inc., Southfield, Mich.

[21] Appl. No.: 09/135,244

[22] Filed: Aug. 17, 1998

[51] Int. Cl.[7] .................................................. B60Q 3/02
[52] U.S. Cl. ........................ 362/486; 362/494; 362/276
[58] Field of Search ..................................... 362/116, 493, 362/496, 486, 495, 494, 191, 190, 276, 802

[56] References Cited

U.S. PATENT DOCUMENTS

| | | | |
|---|---|---|---|
| 1,569,041 | 1/1926 | Shay | 362/486 |
| 2,586,265 | 2/1952 | Russell | 362/398 |
| 4,819,134 | 4/1989 | Rossi | 362/486 |
| 4,825,345 | 4/1989 | Stevens | 362/486 |
| 4,890,907 | 1/1990 | Vu et al. . | |
| 4,916,430 | 4/1990 | Vu et al. . | |
| 4,974,129 | 11/1990 | Grieb et al. . | |
| 5,077,643 | 12/1991 | Leach | 362/486 |
| 5,195,817 | 3/1993 | Deccio | 362/191 |
| 5,208,618 | 5/1993 | Brunette . | |
| 5,371,659 | 12/1994 | Pastrick et al. . | |
| 5,434,758 | 7/1995 | Zeidler | 362/191 |
| 5,497,306 | 3/1996 | Pastrick . | |
| 5,602,525 | 2/1997 | Hsu . | |
| 5,669,704 | 9/1997 | Pastrick | 362/494 |
| 5,669,705 | 9/1997 | Pastrick et al. . | |
| 5,908,233 | 6/1999 | Heskett et al. | 362/486 |

FOREIGN PATENT DOCUMENTS

| | | |
|---|---|---|
| 58012847 | 1/1983 | Japan . |
| 02171351 | 7/1990 | Japan . |

*Primary Examiner*—Thomas M. Sember
*Attorney, Agent, or Firm*—MacMillan, Sobanski, & Todd, LLC

[57] ABSTRACT

A removable light is mounted into an exterior mirror on a vehicle. The light selectively provides illumination when mounted in the mirror. When removed from the mirror, the light provides an optional flashlight accessory.

14 Claims, 2 Drawing Sheets

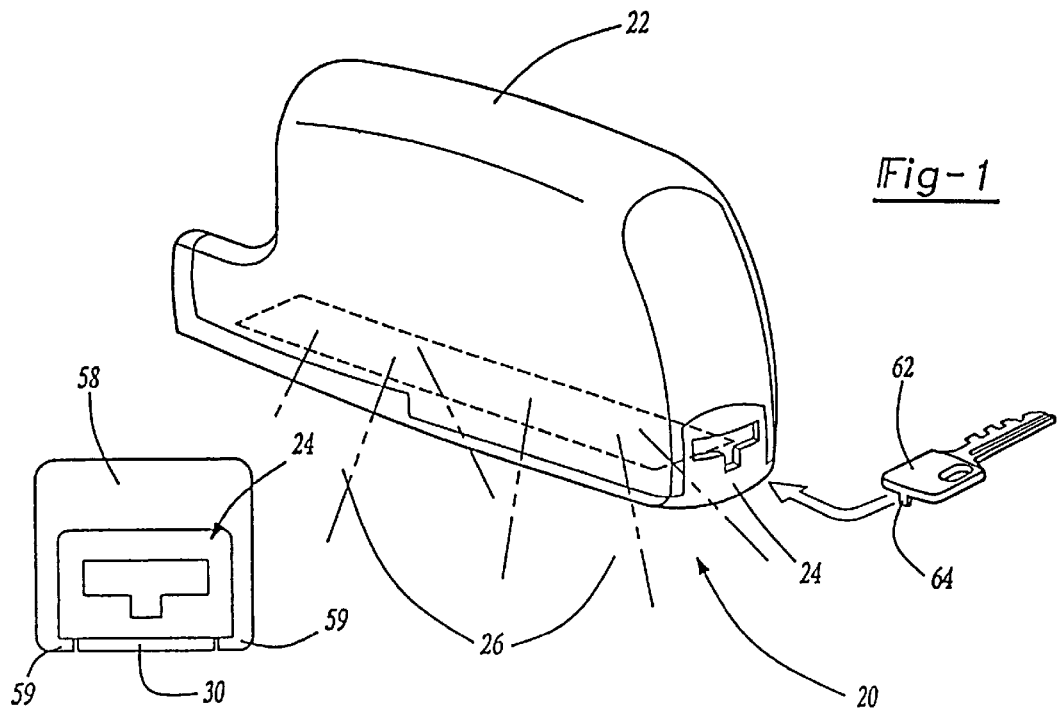
Fig-1
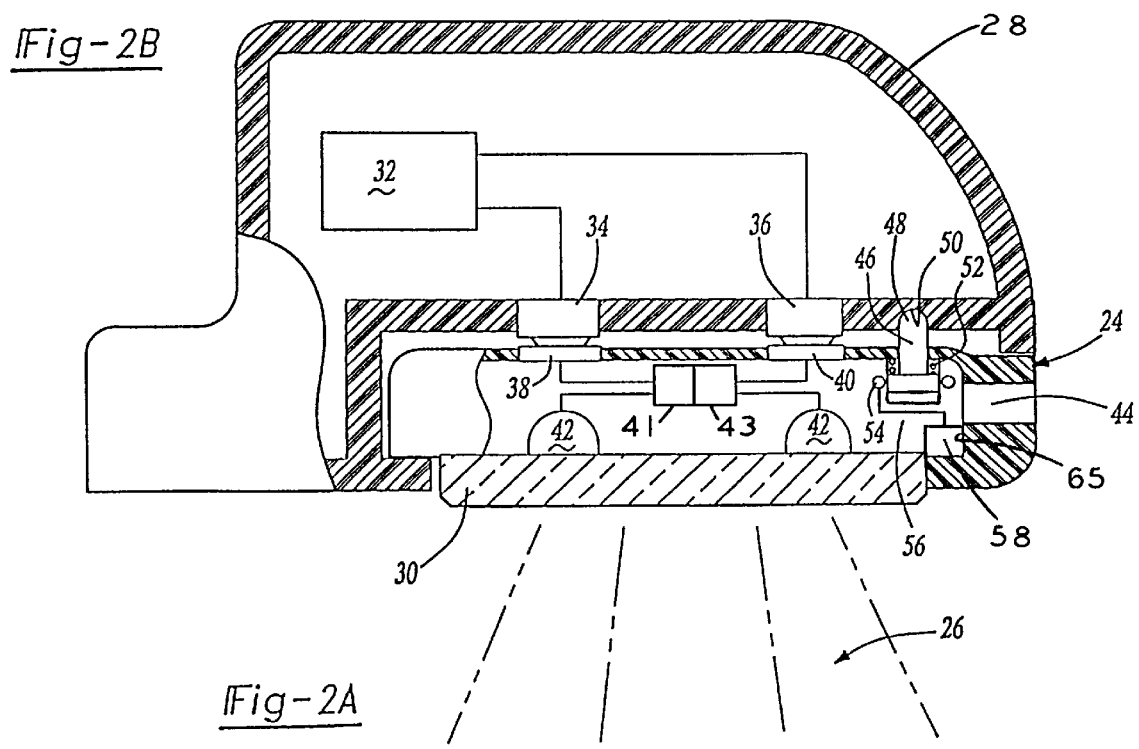
Fig-2B
Fig-2A

SIDE VIEW MIRROR WITH DETACHABLE FLASHLIGHT

BACKGROUND OF THE INVENTION

This invention relates to a light which functions as a puddle light when mounted in an external vehicle mirror, but which is removable for use as a flashlight.

Vehicles are becoming equipped with more and more optional features to provide additional benefits and features to the vehicle operator. As an example, external side view mirrors are often provided with lights which illuminate an area adjacent the mirror, such as the ground. These lights may be actuated whenever the door is opened, or when the door locks are opened by a remote entry system. The lights then illuminate the ground around the door such that the driver will have an illuminated area around the door to detect puddles, or other obstacles.

It is desirable to provide other options to the vehicle operator. One optional accessory that would be valuable is a flashlight. It has been proposed to provide flashlights in the interior of the vehicle, such as clipped to the visor, or associated with the rear view mirror. The known vehicle mounted flashlights have not performed any function other than a flashlight. Thus, the operator may at some time remove the flashlight and not returned it to its mounted position. These optional flashlights provide no function other than that provided by the typical store bought flashlight. Thus, the operator does not have any reason to return them to their mounted location. The flashlights may thus not be returned and are quickly lost, etc.

SUMMARY OF THE INVENTION

In a disclosed embodiment of this invention, a light is incorporated into a mount location on the exterior of the vehicle. Preferably, the light is mounted into the side view mirror. The light is operable to provide illumination adjacent to the vehicle exterior under certain conditions. The light is also removable from its mounted position such that the operator may utilize the light as a flashlight.

In preferred embodiments of this invention, the light is a courtesy light incorporated into the side view mirror which is automatically actuatable under certain condition. As examples, the light may be actuated whenever the vehicle door is opened, or whenever a remote entry system unlocks the vehicle door locks. The light is then automatically actuated to provide illumination. Preferably, the light is removable. Electrical connections are made to the light when mounted in the mirror, through the side view mirror. Preferably the connections are slidable connections such that the light can be removed.

The light is preferably locked in place, until the operator utilizes a key-type removal system to remove the light. In one embodiment, the light is locked in place in the rear view mirror until a coded key member is inserted into the light. The coded key member actuates the lock to release the lock.

These and other features of the present invention can be best understood from the following specification and drawings, the following of which is a brief description.

BRIEF DESCRIPTION OF THE DRAWINGS

FIG. 1 shows a perspective view of an exterior vehicle mirror.

FIG. 2A is a cross-sectional view through the exterior mirror.

FIG. 2B is an end view of the mirror.

DETAILED DESCRIPTION OF THE PREFERRED EMBODIMENT

Figure 3:
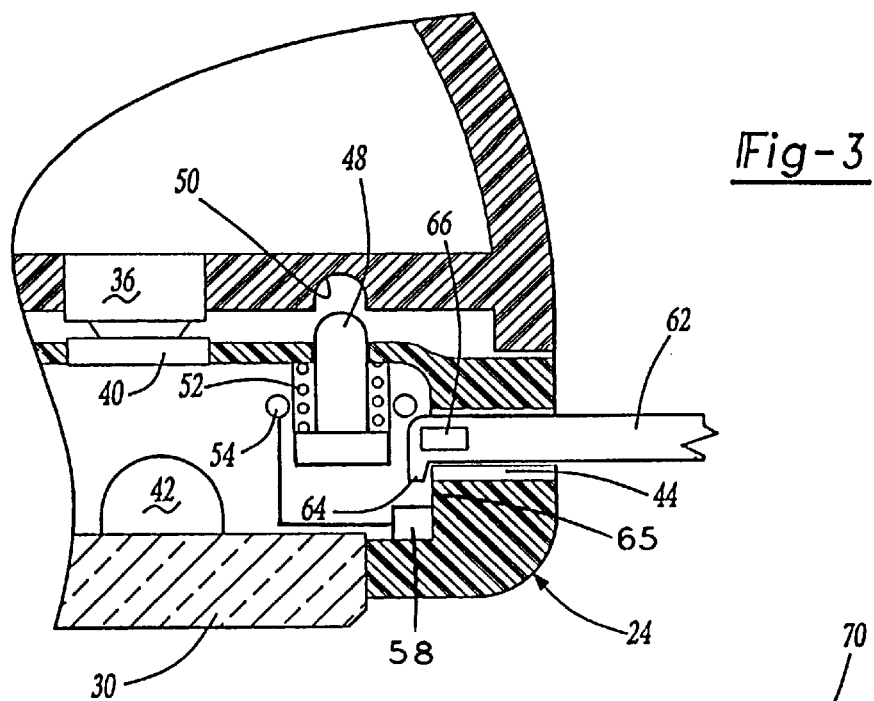
FIG. 3 shows the removal of the light.

FIG. 1 shows an exterior side view mirror 20 incorporating a mirror surface 22. A removable light member 24 provides illumination, such as at 26 beneath the mirror.

FIG. 2 is a cross sectional view through mirror 20. As shown, housing 28 receives light member 24. Light member 24 incorporates a lens 30 beneath the light. As shown, a control 32 communicates power and control signals through contacts 34 and 36 to respective contacts 38 and 40 in the removable light member 24. The contacts 38 and 40 communicate to a control 41 for actuating lights 42 to provide the illumination 26 through lens 30. Control 32 communicates with a power supply, preferably mounted on the vehicle, such that the lights 42 are actuated through the control 41 when the flashlight 24 is mounted within the mirror. The lights 42 may be actuated whenever the vehicle doors are opened, whenever the remote entry system is actuated to unlock the vehicle doors, etc. The light then provides illumination adjacent to the vehicle doors. Some control for specifically actuating the lights at other times may also be provided. Further, the control provides recharging power to a battery 43 associated with control 41.

A key entry space 44 is utilized to allow light member 24 to be selective removed, as desired. A lock 46 includes a lock pin 48 locking the light member 24 into an opening 50 in the housing 28. As shown, the lock includes a spring 52 biasing the lock 46 downwardly, and a solenoid 54 for selectively biasing the lock against the force of the spring. A space 56 is also provided to allow the lock 48 to move under the force of the spring 52. A control sensor 58, shown schematically, is positioned adjacent space 40, for a purpose to be described below.

As shown in FIG. 2B, ledges 59 assist in holding the light 24 within housing 28.

As shown in FIG. 3, a key member 62 has now been inserted into space 44. A finger 64 has snapped behind an entry ledge 65, and secures the key member 62 within light member 24. A code member 66, shown schematically, is associated with the forward portion of the key 62. Such coding is known and utilized on modern keys for a variety of purposes. Sensor 58 is operable to detect code 66 and determine whether the appropriate key has been inserted into space 44. If so, then solenoid 54 may be deactivated, and spring 52 can then bias the lock 48 out of the space 50. Of course, rather than biasing the lock out of the space, the spring could bias the lock into the space, and the solenoid could be utilized to pull the lock against the force of the spring if the appropriate coded key is inserted. At any rate, once the lock has moved out of the space 50, the key and the light 24 may both be removed from the mirror 28.

Figure 4:
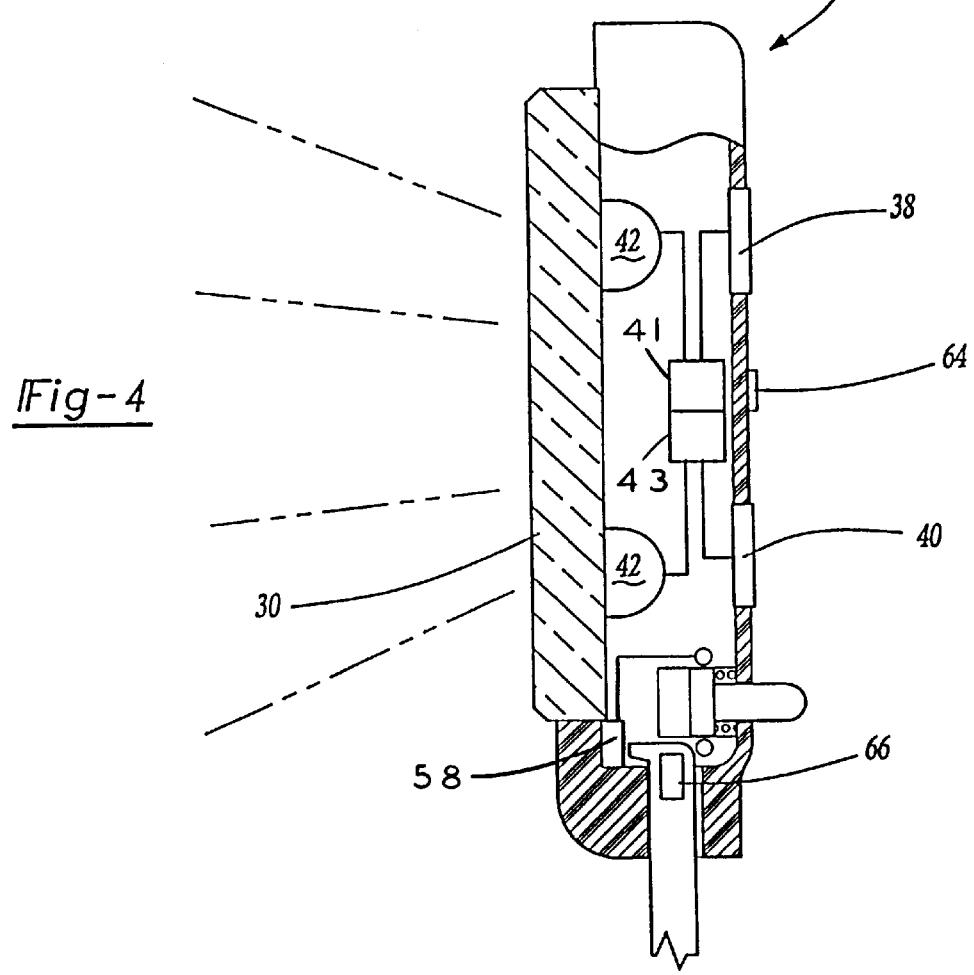
FIG. 4 shows the light having been removed from the mirror.

As shown at 70 in FIG. 4, once the light member 24 has been removed, the lights 42 function as a flashlight. At this time, key 62 may be utilized as part of a handle for the light. A switch 64 is utilized to selectively actuate the light member 24 through its control 41. Control 41 includes a rechargeable battery 43. The battery 43 is preferably recharged when the light is mounted in the mirror.

The appropriate controls and electrical circuitry for providing the disclosed functions are well within the skill of a worker in the art. It is the provision of these controls and features which are the inventive aspects of this application.

A preferred embodiment of this invention has been disclosed; however, a worker of ordinary skill in the art would recognize that certain modifications come within the scope of this invention. For that reason, the following claims should be studied to determine the true scope and content of this invention.

What is claimed is:

1. A lighting assembly for a vehicle comprising:

a light member to be mounted on an exterior surface of a vehicle;

a structure for removably mounting said light member on said exterior surface of said vehicle, and said light member being operable to provide illumination when mounted on said exterior surface of said vehicle, and said light member being operable to provide illumination when removed from said structure, wherein said light member is removable upon insertion of a coded member into a portion of said light member.

2. A lighting assembly as recited in claim 1, wherein said light member is mounted in an exterior mirror on said vehicle.

3. A lighting assembly as recited in claim 2, wherein said light member provides illumination downwardly from said exterior mirror.

4. A lighting assembly as recited in claim 1, wherein said coded member is associated with a key for said vehicle.

5. A lighting assembly as recited in claim 1, wherein said light member has a switch to be operated as a flashlight when removed from said structure.

6. A lighting assembly as recited in claim 5, wherein a battery in said flashlight is recharged when said light is mounted on said vehicle.

7. An assembly as recited in claim 1, wherein said light member is actuated in conjunction with actuation of other vehicle accessories.

8. An assembly as recited in claim 7, wherein said light member is actuated when a vehicle door is opened.

9. An assembly as recited in claim 7, wherein said light member is actuated when a remote entry system is actuated to unlock the vehicle doors.

10. A lighting assembly and mirror combination comprising:

an exterior mirror housing to be mounted on an exterior of a vehicle;

a light member mounted within said housing, said light member being removably locked within said housing by a lock member, said light member having a light for providing illumination outwardly of said housing when mounted within said housing, and a control for actuating said light selectively while said light member is mounted within said housing; and said light member being removable from said housing by unlocking said lock, and said light being operable for providing illumination once removed from said housing, wherein said lock is selectively actuatable by a coded key member.

11. An assembly as recited in claim 10, wherein a battery is provided on said light member for providing power to said light member when said light member has been removed, and said battery being recharged when said light member is mounted in said mirror.

12. A lighting assembly as recited in claim 10, herein said lock includes a lock pin for locking said light member into an opening in said housing.

13. A lighting assembly as recited in claim 10, wherein said lock includes a spring for biasing against said lock, and a solenoid for selectively biasing said lock against said spring.

14. A lighting assembly as recited in claim 10, further comprising a control sensor for detecting said coded key member when said coded key member selectively actuates said lock.

* * * * *

UNITED STATES PATENT AND TRADEMARK OFFICE
CERTIFICATE OF CORRECTION

PATENT NO. : 6,079,858
DATED : June 27, 2000
INVENTOR(S) : Thomas S. Hicks

It is certified that error appears in the above-identified patent and that said Letters Patent are hereby corrected as shown below:

In Column 3, Claim 6, line 2, after the word "light" insert --member--.

Signed and Sealed this

Third Day of April, 2001

Attest:

NICHOLAS P. GODICI

Attesting Officer     *Acting Director of the United States Patent and Trademark Office*